US012267445B2

(12) United States Patent
Seo et al.

(10) Patent No.: US 12,267,445 B2
(45) Date of Patent: Apr. 1, 2025

(54) MULTI-FOLDABLE ELECTRONIC DEVICE

(71) Applicant: Samsung Electronics Co., Ltd., Suwon-si (KR)

(72) Inventors: Pilwon Seo, Suwon-si (KR); Jinwan An, Suwon-si (KR); Jiwoo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 336 days.

(21) Appl. No.: 17/751,013

(22) Filed: May 23, 2022

(65) Prior Publication Data

US 2022/0294886 A1 Sep. 15, 2022

Related U.S. Application Data

(63) Continuation of application No. PCT/KR2021/009701, filed on Jul. 27, 2021.

(30) Foreign Application Priority Data

Jul. 27, 2020 (KR) .......................... 10-2020-0093131

(51) Int. Cl.
*H04M 1/02* (2006.01)
*G06F 1/16* (2006.01)
(Continued)

(52) U.S. Cl.
CPC ........ *H04M 1/0216* (2013.01); *G06F 1/1624* (2013.01); *G06F 1/1641* (2013.01);
(Continued)

(58) Field of Classification Search
None
See application file for complete search history.

(56) References Cited

U.S. PATENT DOCUMENTS 10,164,208 B2    12/2018 Lee et al.
10,334,750 B2 *   6/2019 Koo .................... H04M 1/0268
(Continued)

FOREIGN PATENT DOCUMENTS

CN    110062077 A        7/2019
CN    112055103 A  * 12/2020  ............. G04C 10/00
(Continued)

OTHER PUBLICATIONS

Extended European Search Report dated Dec. 22, 2023, issued in European Application No. 21850281.3-1224.
(Continued)

*Primary Examiner* — Mohammed Rachedine
(74) *Attorney, Agent, or Firm* — Jefferson IP Law, LLP

(57) ABSTRACT

A foldable electronic device is provided. The foldable electronic device includes a first housing, a second housing, a third housing, a first folding unit configured to allow the first and second housings to be folded in a first folding manner, a second folding unit configured to allow the second and third housings to be folded in a second folding manner, a flexible display disposed across the first to third housings, and a metal plate disposed to face the flexible display to support the folding operation of the flexible display, and including a first folding area in which a first pattern is disposed and a second folding area in which a second pattern different from the first pattern is disposed.

25 Claims, 16 Drawing Sheets

(51) Int. Cl.
   *G09F 9/30*     (2006.01)
   *G09G 3/00*     (2006.01)
   *G09G 3/3208*   (2016.01)

(52) U.S. Cl.
   CPC ........... *G06F 1/1652* (2013.01); *G09G 3/035* (2020.08); *G09G 3/3208* (2013.01); *H04M 1/0237* (2013.01); *H04M 1/0268* (2013.01); *H04M 2201/38* (2013.01)

(56) References Cited

U.S. PATENT DOCUMENTS

| | | | |
|---|---|---|---|
| 10,622,420 B2 | 4/2020 | Choi et al. | |
| 11,139,687 B2 | 10/2021 | Kim et al. | |
| 2015/0146386 A1 | 5/2015 | Namkung et al. | |
| 2017/0315645 A1 | 11/2017 | Park et al. | |
| 2018/0097197 A1 | 4/2018 | Han et al. | |
| 2018/0103132 A1* | 4/2018 | Prushinskiy | G06F 1/16 |
| 2019/0141843 A1 | 5/2019 | Park et al. | |
| 2019/0261519 A1 | 8/2019 | Park et al. | |
| 2020/0371553 A1* | 11/2020 | Hsu | G06F 1/1624 |
| 2022/0103670 A1* | 3/2022 | Liao | H04M 1/0216 |

FOREIGN PATENT DOCUMENTS

| | | | | | |
|---|---|---|---|---|---|
| CN | 112506386 | A | * | 3/2021 | ........... G06F 1/1641 |
| CN | 113454567 | A | * | 9/2021 | ........... G06F 1/1616 |
| DE | 202020100190 | U1 | | 4/2020 | |
| KR | 10-2015-0062237 | A | | 6/2015 | |
| KR | 10-2016-0144912 | A | | 12/2016 | |
| KR | 10-2017-0091915 | A | | 8/2017 | |
| KR | 10-2017-0122892 | A | | 11/2017 | |
| KR | 10-2018-0036904 | A | | 4/2018 | |
| KR | 10-2019-0003257 | A | | 1/2019 | |
| KR | 10-2019-0049454 | A | | 5/2019 | |
| KR | 10-2019-0101184 | A | | 8/2019 | |
| KR | 10-2020-0012359 | A | | 2/2020 | |
| WO | WO-2020211948 | A1 | * | 10/2020 | ........... G06F 1/1624 |
| WO | WO-2021093951 | A1 | * | 5/2021 | ........... G06F 1/1616 |

OTHER PUBLICATIONS

Korean Office Action dated Oct. 7, 2024, issued in Korean Application No. 10-2020-0093131.

* cited by examiner

MULTI-FOLDABLE ELECTRONIC DEVICE

CROSS-REFERENCE TO RELATED APPLICATION(S)

This application is a continuation application, claiming priority under § 365(c), of an International application No. PCT/KR2021/009701, filed Jul. 27, 2021, which is based on and claims the benefit of a Korean patent application number 10-2020-0093131, filed on Jul. 27, 2020, in the Korean Intellectual Property Office, the disclosure of which is incorporated by reference herein in its entirety.

BACKGROUND

Field

The disclosure relates to a multi-foldable electronic device. More particularly, the disclosure relates to a foldable display mounting structure that is folded one or more times.

Description of Related of Art

A foldable electronic device may include a foldable display made of a flexible material. In such a foldable display, a back plate is disposed on the bottom surface so that the foldable display can be supported by the back plate. For example, as the foldable display, an organic light-emitting diode (OLED) display may be used. The OLED display is a display using a self-luminous organic material that emits light by itself when current flows therein, and is used as a display for a wide range of electronic devices due to its advantage for a thin structure, a wide viewing angle, and a fast response speed.

A back plate may have greater stiffness than a display substrate and may be made of a metal material such as steel use stainless (SUS). In the back plate, an elastic deformation section may be expanded by providing at least one opening pattern in a folding area thereof. However, when a foldable electronic device of the related art is a multi-foldable electronic device having rotation directions with different curvatures, it may be difficult to accommodate elastic deformation of the back plate.

Accordingly, an aspect of the disclosure is to provide a multi-foldable electronic device including a Z-foldable multi-foldable display mounting structure.

Another aspect of the disclosure is to provide a multi-foldable electronic device that is capable of stably providing an in-folding/out-folding operation thereof by including a flexible metal plate constituting differential patterns in display folding areas including a plurality of folding units and having different folding rotation directions (e.g., in-folding and out-folding) and radii of curvature.

SUMMARY

In accordance with an aspect of the disclosure, a foldable electronic device includes a first housing, a second housing, a third housing, a first folding unit configured to allow the first and second housings to be folded in a first folding manner, a second folding unit configured to allow the second and third housings to be folded in a second folding manner, a flexible display disposed across the first to third housings, and a metal plate disposed to face the flexible display to support the folding operation of the flexible display, and including a first folding area in which a first pattern is disposed and a second folding area in which a second pattern different from the first pattern is disposed.

According to various embodiments of the disclosure, by providing different patterns in the folding portions of the metal plate supporting the multi-foldable display, it is possible to implement a stable Z-folding operation including in-folding and out-folding operations of the multi-foldable display.

According to various embodiments of the disclosure, by providing different patterns in the folding portions of the metal plate supporting the multi-foldable display, it is possible to implement various folding operations of the multi-foldable display.

BRIEF DESCRIPTION OF THE DRAWINGS

Throughout the drawings, it should be noted that like reference numbers are used to depict the same or similar elements, features, and structures.

DETAILED DESCRIPTION

Figure 1:
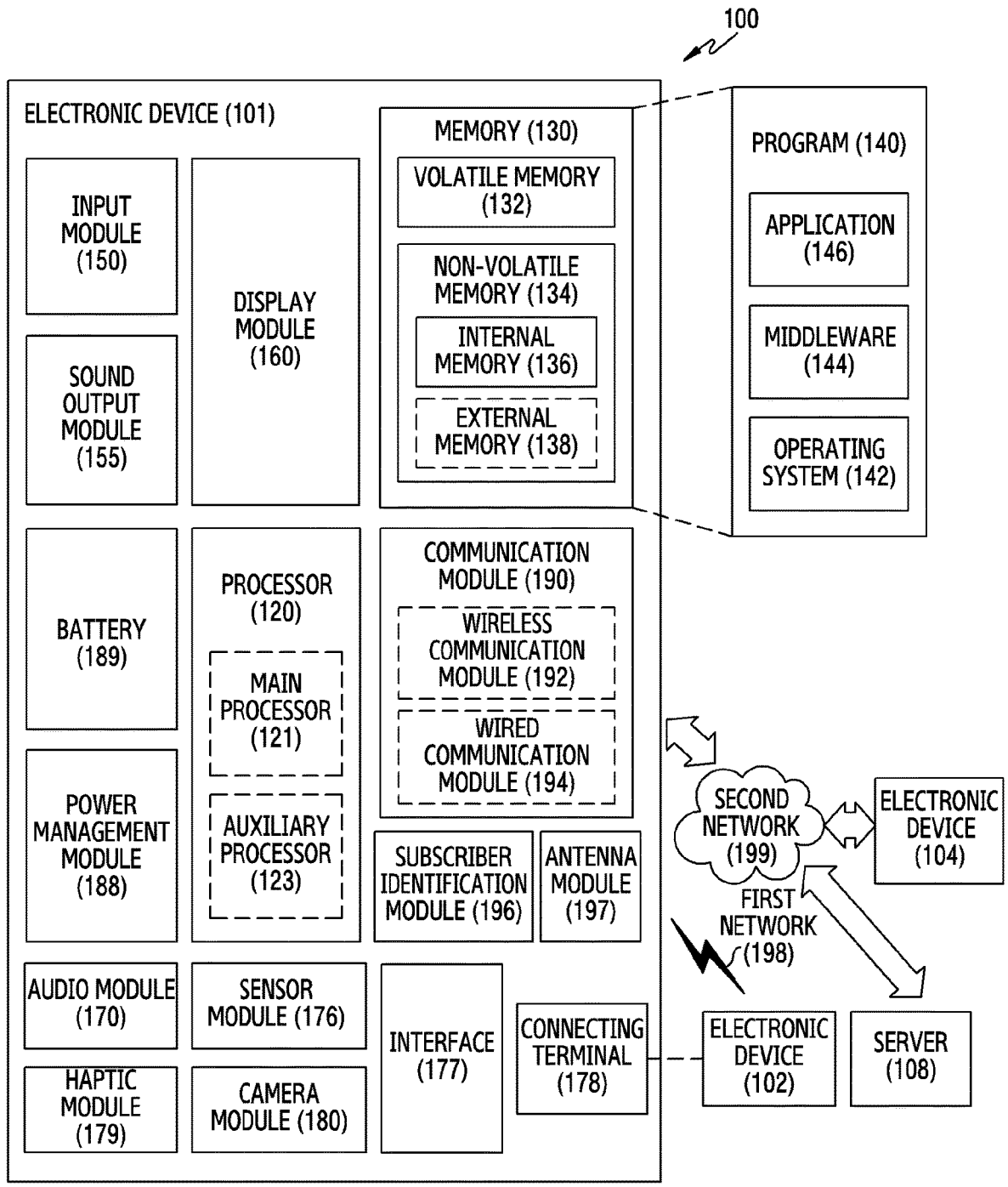
FIG. 1 is a block diagram illustrating a configuration of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include internal memory 136 and/or external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (IC) (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
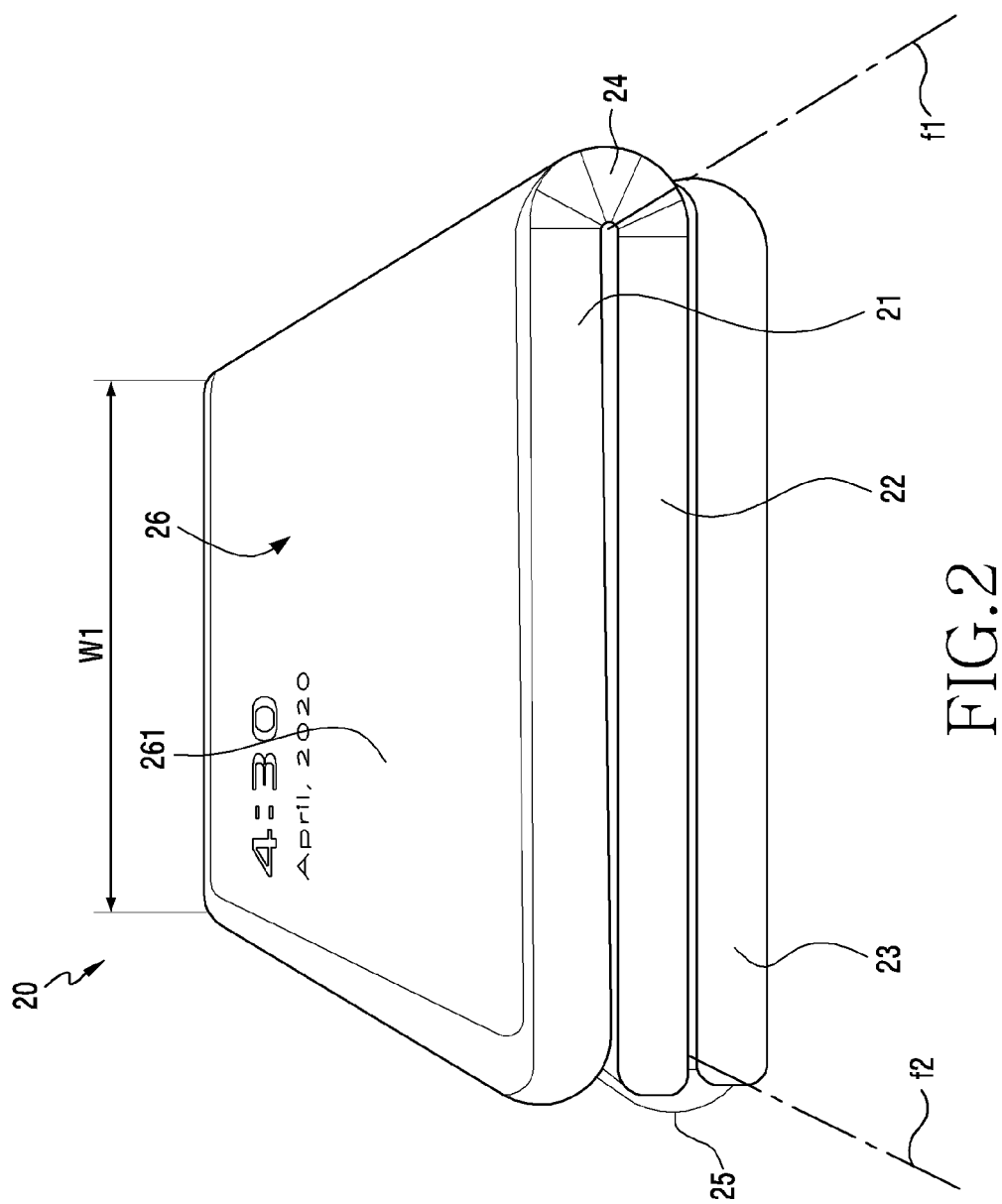
FIG. 2 is a perspective view illustrating an electronic device in a full-folding mode according to an embodiment of the disclosure.

FIG. 2 is a perspective view illustrating an electronic device in a full-folding mode according to an embodiment of the disclosure.

Figure 3:
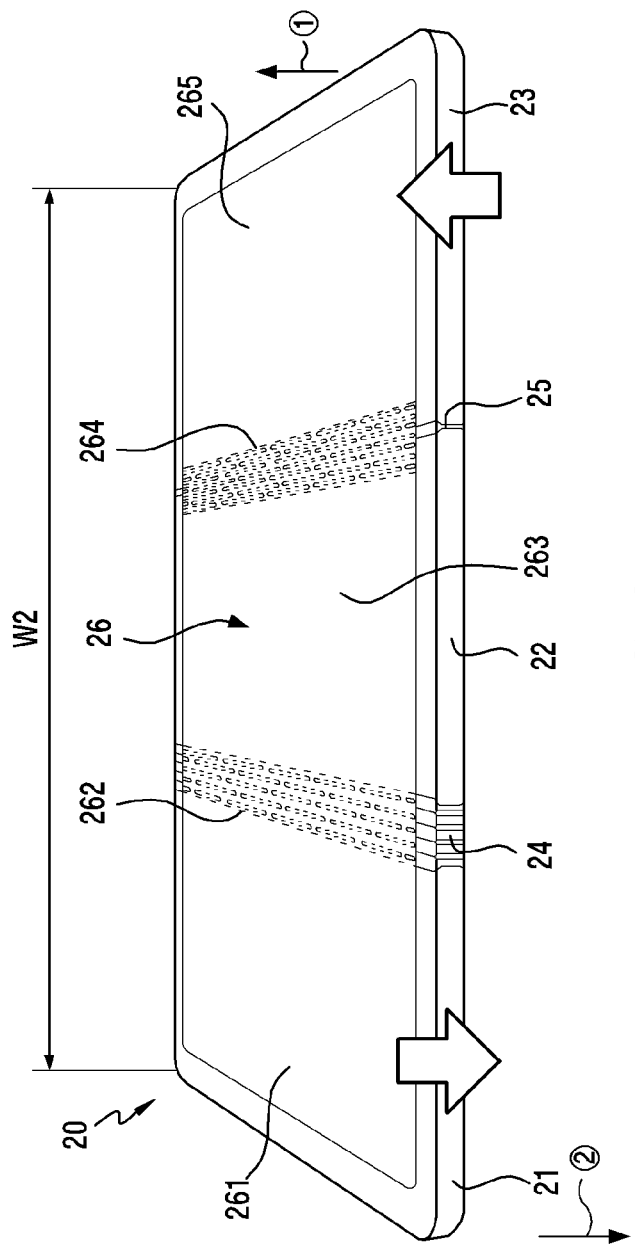
FIG. 3 is a perspective view illustrating an electronic device in a full-unfolding mode according to an embodiment of the disclosure.

FIG. 3 is a perspective view illustrating an electronic device in a full-unfolding mode according to an embodiment of the disclosure.

Figure 4:
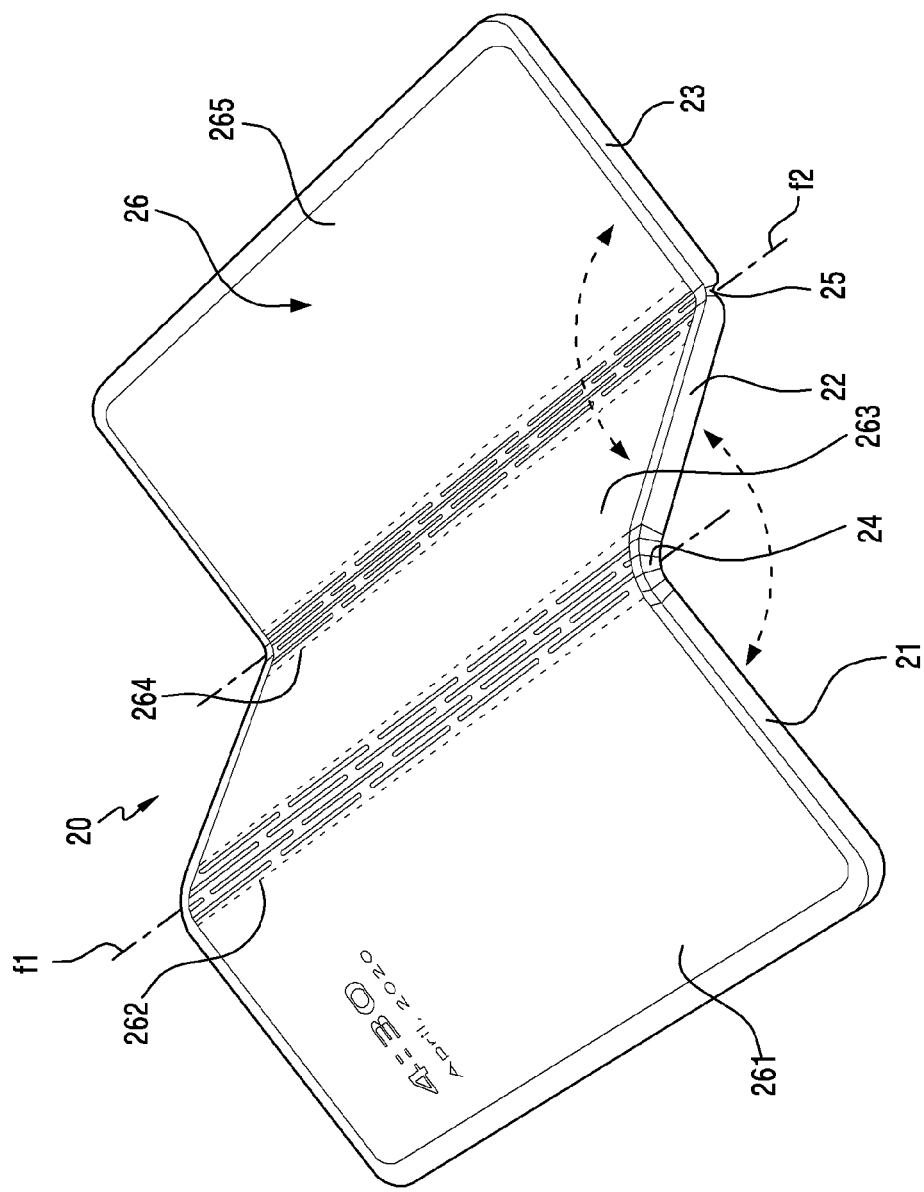
FIG. 4 is a perspective view illustrating an electronic device in a flex mode according to an embodiment of the disclosure.

FIG. 4 is a perspective view illustrating an electronic device in a flex mode according to an embodiment of the disclosure.

Referring to FIGS. 2 to 4, an electronic device 20 according to an embodiment may be the same as the electronic device 101 illustrated in FIG. 1. According to an embodiment, the electronic device 20 is a multi-foldable electronic device 20 capable of Z-folding, and may include first to third housings 21, 22, and 23, a flexible display 26, first and second folding units 24 and 25, and/or a metal plate 30. According to an embodiment, the electronic device 20 may be a multi-foldable electronic device 20 capable of Z-folding since the first and second housings 21 and 22 are folded by the first folding unit 24 in a first folding operation, and the second and third housings 22 and 23 are folded by the second folding unit 25 in a second folding operation. For example, the first folding operation may include an out-folding operation, and the second folding operation may include an in-folding operation. Hereinafter, the first folding operation will be referred to as an out-folding operation, and the second folding operation will be referred to as an in-folding operation.

According to an embodiment, the first folding unit 24 may enable the out-folding operation of the first and second housings 21 and 22, and the second folding unit 25 may enable the in-folding operation of the second and third housings 22 and 23. According to an embodiment, the out-folding operation may include an operation in which the flexible display 26 is foldable such that first and second flat areas 261 and 263 thereof are oriented in opposite directions in the folded state. According to an embodiment, the in-folding operation may include an operation in which the first flexible display is foldable such that the second and third flat regions 263 and 265 face each other.

According to an embodiment, the electronic device 20 may configure a plurality of folding modes according to the folding states of the first and second folding units 24 and 25 (e.g., an out-folding unit and an in-folding unit). For example, the electronic device 20 of FIG. 2 may be provided with a full-folding mode folded around the first and second folding units 24 and 25, that is, having the narrowest width W1, the electronic device 20 of FIG. 3 may be provided with a full-unfolding mode in which the first and second folding units 24 and 25 are unfolded, that is, a full-unfolding mode having the widest width W2, and the electronic device 20 of FIG. 4 may be provided with a partial folding mode, that is, a flex mode according to the folding state of the first and second folding units 24 and 25.

According to an embodiment, in the full-unfolding mode, the electronic device 20 may be switched into the flex mode which is a partial-folding mode by folding the first housing 21 in a downward direction ② (e.g., a direction opposite to a first direction ①) by a first folding angle and folding the third housing 23 in the upward direction (e.g., the first direction ①) by a second folding angle. For example, the first and second folding angles may be approximately between 0 degrees (i.e., straight) and 180 degrees (i.e., fully folded). When the first and second folding angles are 0 degrees, the electronic device 20 may be in the full-folding mode, and when the first and second folding angles are 180 degrees, the electronic device 20 may be in the full-unfolding mode. According to an embodiment, the first folding unit 24 may provide a first folding axis f1, and the second folding unit 25 may provide a second folding axis f2 parallel to the first folding axis f1.

According to an embodiment, in response to the user's pressing, the electronic device 20 may implement an out-folding operation by the first folding unit 24 and sequentially implement an in-folding operation by the second folding unit 25. According to an embodiment, according to this folding operation, the electronic device 20 may be sequentially switched from the flex mode to the full folding mode. As another example, in response to the user's bi-directional pressing, that is, a force in the second direction (e.g., a downward force) on the first housing 21 and a force in the first direction (e.g., an upward force) on the third housing, the electronic device 20 may simultaneously implement a folding operation by the first folding unit 24 and a folding operation by the second folding unit 25, thereby being switched into the full-folding mode.

According to an embodiment, the electronic device 20 may include a flexible display 26 disposed across the first to third housings 21, 22, and 23. According to an embodiment, the flexible display 26 may be disposed on the first to third housings 21, 22, and 23 to be oriented in the first direction ①(e.g., a direction in which the user can face the first to third housings) and to extend across the first to third housings 21, 22, and 23. According to an embodiment, the flexible display 26 may include a touch screen panel. According to an embodiment, the flexible display 26 may include a control circuit. For example, the control circuit may include a display driver IC (DDI) and/or a touch display driver IC (TDDI) arranged in a chip-on-panel (COP) or chip-on-film (COF) manner.

According to an embodiment, the flexible display 26 may include a first folding area 262 according to an out-folding operation and a second folding area 264 according to an in-folding operation. According to an embodiment, the first folding area 262 may be spaced apart from the second folding area 264 and may have a width greater than that of the second folding area 264. According to an embodiment, the flexible display 26 may be a multi-folding display that implements in-folding and out-folding, and may include first to third flat areas 261, 263, and 265 corresponding to the first to third housings 21, 22, and 23, respectively. The first folding area 262 may be disposed between the first and second flat areas 261 and 263, and the second folding area 264 may be disposed between the second and third flat areas 263 and 265.

Figure 5:
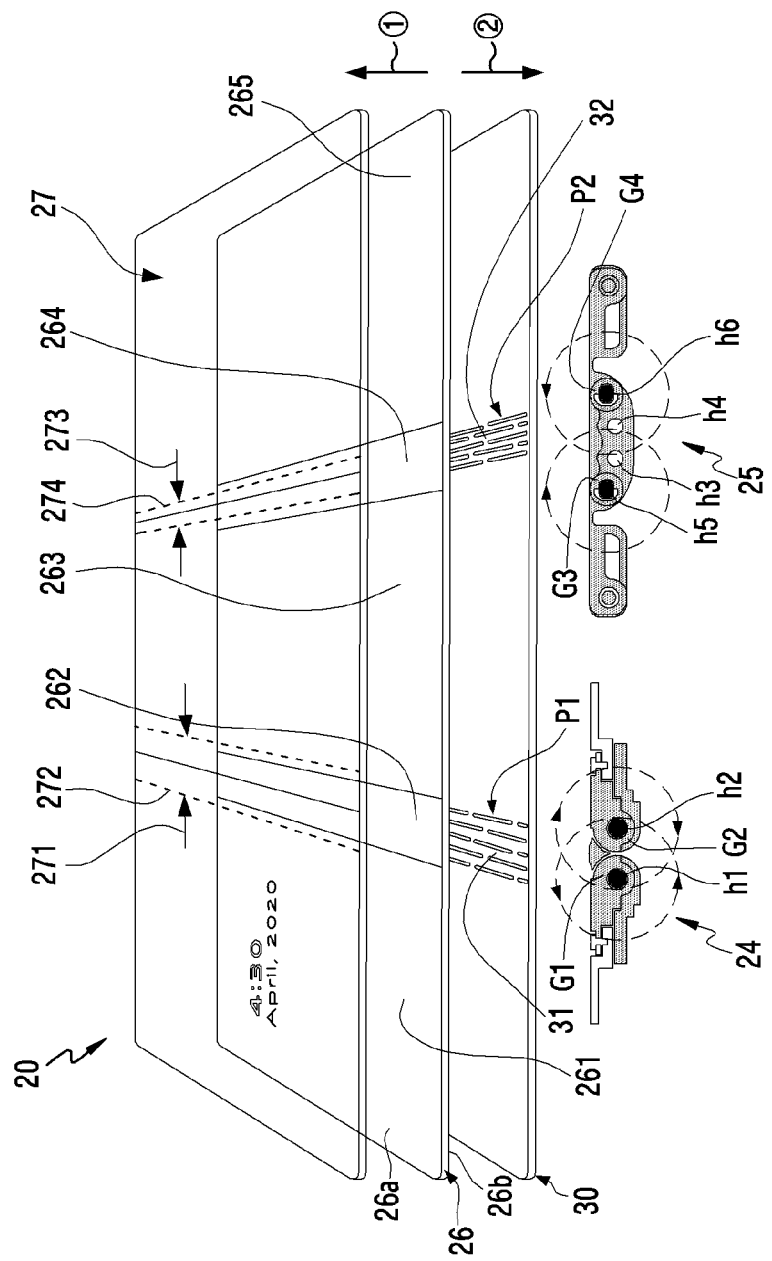
FIG. 5 is an exploded perspective view illustrating a flexible display mounting structure of an electronic device according to an embodiment of the disclosure.

FIG. 5 is an exploded perspective view illustrating a flexible display mounting structure of an electronic device according to an embodiment of the disclosure.

Referring to FIG. 5, the electronic device 20 may include the flexible display 26, a transparent protective layer 27 disposed to be oriented in a first direction ① of the flexible display 26, and/or a metal plate 30 disposed to be oriented in a second direction ② of the flexible display 26. According to an embodiment, the transparent protective layer 27 may protect the flexible display 26 from the external environment, and the metal plate 30 may support the flexible display 26. For example, the transparent protective layer 27 may include a transparent substrate or transparent glass.

According to an embodiment, the transparent protective layer 27 may include at least one of an ultra-thin glass (UTG) layer, a transparent polymer layer, a composite (polymer+UTG) layer, or a composite (polymer+UTG+polymer) layer, which has a low repellent force against folding to be dually foldable. For example, the UTG has a higher modulus than that of a polymer layer due to a glass property, and the polymer layer may protect the UTG and the flexible display 26 from an external impact.

According to an embodiment, the transparent protective layer 27 may include first and second folding areas 272 and 274. According to an embodiment, the first folding area 272 may be a portion folded according to an out-folding operation, and the second folding area 274 may be a portion folded according to an in-folding operation. According to an embodiment, a width 271 of the first folding area 272 of the transparent protective member may be greater than a width 273 of the second folding area 274. According to an embodiment, the width 271 of the first folding area 272 of the transparent protective layer 27 may be greater than the width of a first folding area 31 of the metal plate 30, and the width 273 of the second folding area 274 of the transparent protective member 27 may be smaller than the width of a second folding area 32 of the metal plate 30.

According to an embodiment, the transparent protective layer 27 may include at least one of an anti-smudge coating capable of preventing contamination by dust or oil, an anti-fingerprint coating, a shatterproof coating, a strength-reinforcing coating, a low-refraction coating, an anti-glare coating, or an anti-reflection coating.

According to an embodiment, the flexible display 26 may have a first surface 26a, which is oriented in the first direction ① and to which the transparent protective layer 27 is attached, and a second surface 26b, which is oriented in the second direction ② and to which the metal plate 30 is attached. For example, a first adhesive layer may be disposed between the transparent protective layer 27 and the flexible display 26, and a second adhesive layer may be disposed between the flexible display 26 and the metal plate 30. According to an embodiment, the first adhesive layer and the second adhesive layer may be made of different adhesive materials. According to an embodiment, the first adhesive layer may be made of a transparent adhesive layer (e.g., an optical clear resin (OCR)-based adhesive material), and the second adhesive layer may be an opaque adhesive layer (e.g., a PSA-based adhesive material). According to an embodiment, the first adhesive layer or the second adhesive layer may include an optical clear adhesive (OCA), an OCR, a pressure sensitive adhesive (PSA), a heat-reactive adhesive, a general adhesive, or a double-sided tape.

According to an embodiment, the metal plate 30 is a flexible metal plate 30 made of an SUS material, and may have a thin-film shape. According to an embodiment, the metal plate 30 may be in the form of a metal sheet, which may be helpful in reinforcing the rigidity of the electronic device, and may be used to block ambient noise and dissipate heat emitted from surrounding heat emission components. According to an embodiment, the metal plate 30 may include at least one of Cu, Al, SUS, or CLAD (e.g., a laminated member in which SUS and Al are alternately disposed). In another embodiment, the metal plate 30 may include other alloy materials. According to an embodiment, the metal plate 30 may be a support member for supporting the flexible display 26 and may have the same size as the flexible display 26. According to an embodiment, the metal plate 30 may include a first pattern P1, which is disposed to correspond to the first folding area 262 (e.g., an out-folding area) of the flexible display 26, and a second pattern P2, which is different from the first pattern P1 and is disposed to correspond to the second folding area 264 (e.g., an in-folding region).

According to an embodiment, each of the first patterns P1 may be arranged parallel to the first folding axis (e.g., the first folding axis f1 illustrated in FIG. 2) and may include a plurality of openings (e.g., holes or recesses) having a longitudinal direction along the first folding axis f1. According to an embodiment, each of the second patterns P2 may be arranged parallel to the second folding axis (e.g., the second folding axis f2 illustrated in FIG. 2) and may include a plurality of openings (e.g., holes or recesses) having a longitudinal direction along the second folding axis f2.

According to an embodiment, the electronic device 20 may include an assembly structure in which different types of gear structures and folding units are coupled to each other to have opposite rotational directions about the first folding unit 24 and the second folding unit 25, respectively. According to an embodiment, the first folding unit 24 providing the first folding axis f1 of the first and second housings 21 and 22 is an assembly configured to provide an out-folding axis and may include first and second hinge axes h1 and h2 provided by first and second gears G1 and G2, which are engaged with each other. For example, the first gear G1 may rotate counterclockwise, and the second gear G2 may rotate clockwise.

According to an embodiment, the second folding unit 25 providing the second folding axis f2 of the second and third housings 22 and 23 is an assembly configured to provide an in-folding axis and may include fifth and sixth hinge axes h5 and h6 provided by third and fourth gears G3 and G4, which are engaged with a pair of gears (not illustrated), respectively. The pair of gears are engaged with each other and provides third and fourth hinge axes h3 and h4, respectively. For example, the third gear G3 may rotate clockwise, and the fourth gear G4 may rotate counterclockwise. According to an embodiment, the first folding unit 24 and the second folding unit 25 are not limited to the above-described structures, and may be variously changed in design according to the structure of the electronic device 20.

Figure 6:
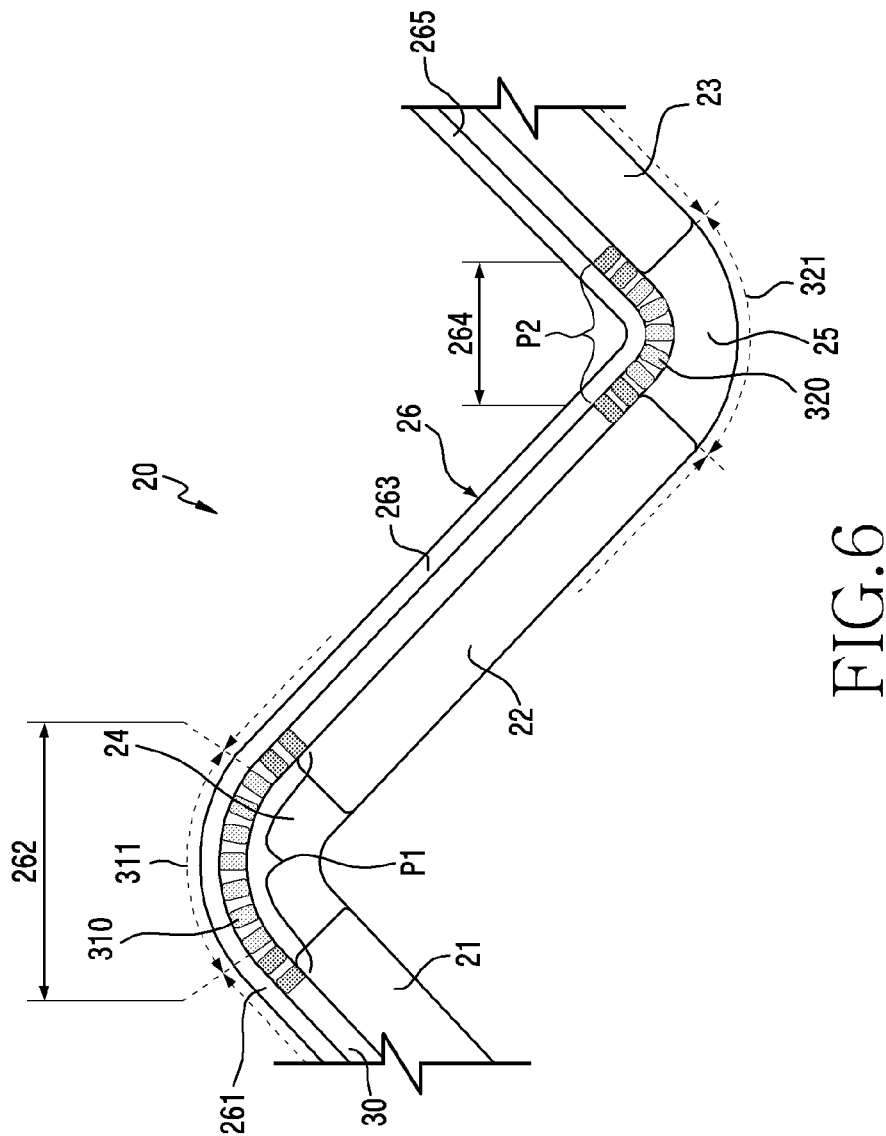
FIG. 6 is a side view illustrating a mounting state of a metal plate having differential pattern structures according to an embodiment of the disclosure.

FIG. 6 is a side view illustrating a mounting state of a metal plate having differential pattern structures according to an embodiment of the disclosure.

Referring to FIG. 6, according to an embodiment, the electronic device 20 may include structures of the first and second patterns P1 and P2, which are different from each other and are configured in the metal plate 30 to correspond to the radii of curvature of the first and second folding areas 262 and 264 of the flexible display 26. For example, in the flexible display 26, the first folding area 262 having a relatively greater radius of curvature may be configured by the first folding unit 24 (e.g., an out-folding unit), and the second folding area 264 having a relatively smaller radius of curvature may be configured by the second folding unit 25 (e.g., an in-folding unit). According to an embodiment, the metal plate 30 may include a first pattern P1 having a wide pattern structure and disposed to correspond to the first folding area 262 (e.g., an out-folding area) having a relatively greater radius and a second pattern P2 having a narrow pattern structure and disposed to correspond to the second folding area 264 (e.g., an in-folding area) having a relatively smaller radius. According to an embodiment, the width of the first pattern P1 may be greater than the width of the second pattern P2. For example, when the openings provided in the first pattern P1 and the openings formed in the second pattern P2 have the same shape, more openings may be provided in the first pattern P1, and thus the width of the first pattern P1 may be greater than the width of the second pattern P2.

According to an embodiment, since the width of each of the openings provided in the first pattern P1 is greater than that of each of the openings provided in the second pattern P2 and the distance between the respective openings in the first pattern P1 is greater than the distance between the respective openings provided in the second pattern P2, the width of the first pattern P1 may be greater than the width of the second pattern P2.

For example, FIG. 6 illustrates, as an example, a structure in which the width of each opening and the distance between the respective openings in the first pattern P1 are greater than the width of each opening and the distance between the respective openings in the second pattern P2. The first pattern P1 may have a width in which 11 openings are present, and the second pattern P2 may have a width in which 9 openings are present.

According to an embodiment, the width of the first pattern P1 of the metal plate may be greater than the width of the first folding area 262 of the flexible display, and the width of the second pattern P2 of the metal plate may be greater than the width of the second folding area 264 of the flexible display. According to an embodiment, the width of the first folding area 262 of the flexible display may be equal to the width of a first bending portion 311 of the metal plate, and the width of the second folding area 264 of the flexible display may be equal to the width of a second bending portion 321 of the metal plate.

Figure 7:
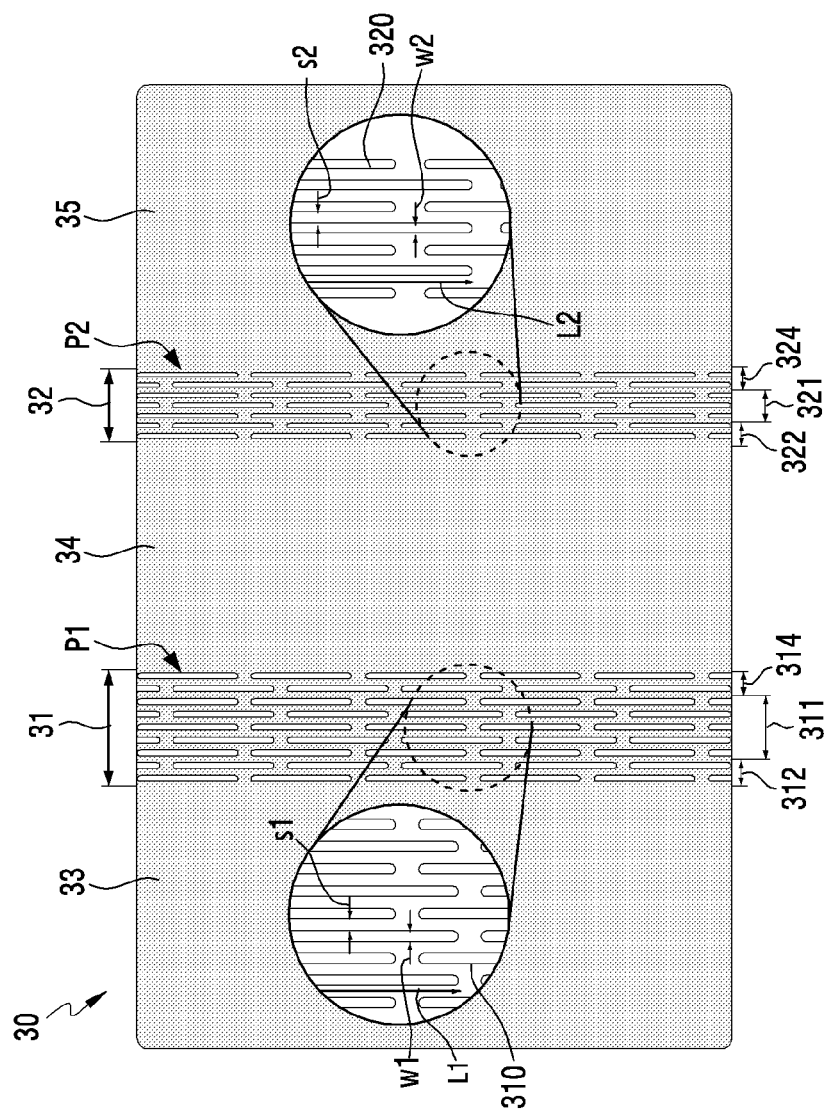
FIG. 7 is a plan view illustrating a metal plate, showing an enlarged view of some patterns according to an embodiment of the disclosure.

FIG. 7 is a plan view illustrating a metal plate, showing an enlarged view of some patterns according to an embodiment of the disclosure.

Referring to FIG. 6 and FIG. 7, according to an embodiment, the metal plate 30 may include first and second folding areas 31 and 32 and first, second, and third flat areas 33, 34, and 35. According to an embodiment, the first folding area 31 may be disposed between the first and second flat areas 33 and 34, and the second folding area 32 may be disposed between the second and third flat areas 34 and 35. According to an embodiment, the first pattern P1 may be formed in the first folding area 31, and the second pattern P2 may be formed in the second folding area 32.

According to an embodiment, the first folding area 31 of the metal plate may include the first bending portion 311 and first and second flat portions 312 and 314. For example, the first and second flat portions 312 and 314 may be disposed on opposite sides of the first bending portion 311. According to an embodiment, the second folding area 32 of the metal plate may include the second bending portion 321 and third and fourth flat portions 322 and 324. For example, the third and fourth flat portions 322 and 324 may be disposed on opposite sides of the second bending portion 321.

According to an embodiment, more openings (holes) may be provided in the first pattern P1 than in the second pattern P2. According to an embodiment, the electronic device 20 may include first openings 310 to provide the first pattern P1 in each of the first bending portion 311 and the first and second flat portions 312 and 314 of the metal plate 30 and second openings 320 to provide the second pattern P2 in each of the second bending portion 321 and the third and fourth flat portions 322 and 324. According to an embodiment, more openings may be provided in the first bending portion 311 or the second bending portion 321 than in the first and second flat portions 312, 314 or the third and fourth flat portions 322 and 324, and more openings may be provided in the first bending portion 311 than in the second bending portion 321.

According to an embodiment, the first pattern P1 may include a plurality of first openings 310, and the second pattern P2 may include a plurality of second openings 320. According to an embodiment, assuming that the first width of each of the first openings 310 is w1, the distance between the respective first openings 310 is s1, the first length of each of the first openings 310 is L1, the second width of each second opening 320 is w2, the distance between the respective second openings 320 is s2, and the second length of each second opening 320 is L2, the first width w1 may be greater than the second width w2, the first distance s1 may be greater than the second distance s2, and the first length L1 may be equal to the second length L2.

According to an embodiment, when the first width w1 and the second width w2 are equal to each other, the first distance s1 may be greater than the second distance s2, and the first length L1 and the length L2 may be equal to each other.

According to an embodiment, when the first width w1 and the second width w2 are equal to each other and the first distance s1 and the second distance s2 are equal to each other, more openings may be provided in the first folding area 31 than in the second folding area 32.

According to an embodiment, the first length L1 may be equal to or different from the second length L2. For example, the first length L1 may be greater than, equal to, or smaller than the second length L2.

According to an embodiment, each of the first openings 310 and the second openings 320 may have a linear shape extending along the folding axis, but it is not necessarily limited to the linear shape, and may have various shapes (e.g., one or a combination of two or more of a circular shape, an elliptical shape, a polygonal shape, or a geometric shape). According to an embodiment, filling members (e.g., an insulating material) may be filled in the respective first openings 310 or second openings 320. According to an embodiment, the first openings 310 or the second openings 320 may be provided to define a flat surface on the metal plate 30 with the filling members. According to an embodiment, the filling members may include an elastic material that is cured and/or solidified after being filled in the first openings 310 or the second openings 320. According to an embodiment, the filling members may include resin, urethane, silicone, or rubber.

In some embodiments, among the first openings 310 or the second openings 320 in the metal plate 30, the filling material filled in the first and second bending portions 311 and 321' and the filling material filled in the first to fourth flat portions 312, 314, 322, and 324 may have different modulus properties. For example, the filling material filled in the openings in the first and second bending portions 311 and 321 may be helpful for a bending property by having a soft property, and the filling material filled in the openings in the first to fourth flat portions 312, 314, 322, and 324 may be helpful in reinforcing rigidity by having a relatively rigid property.

Figure 8:
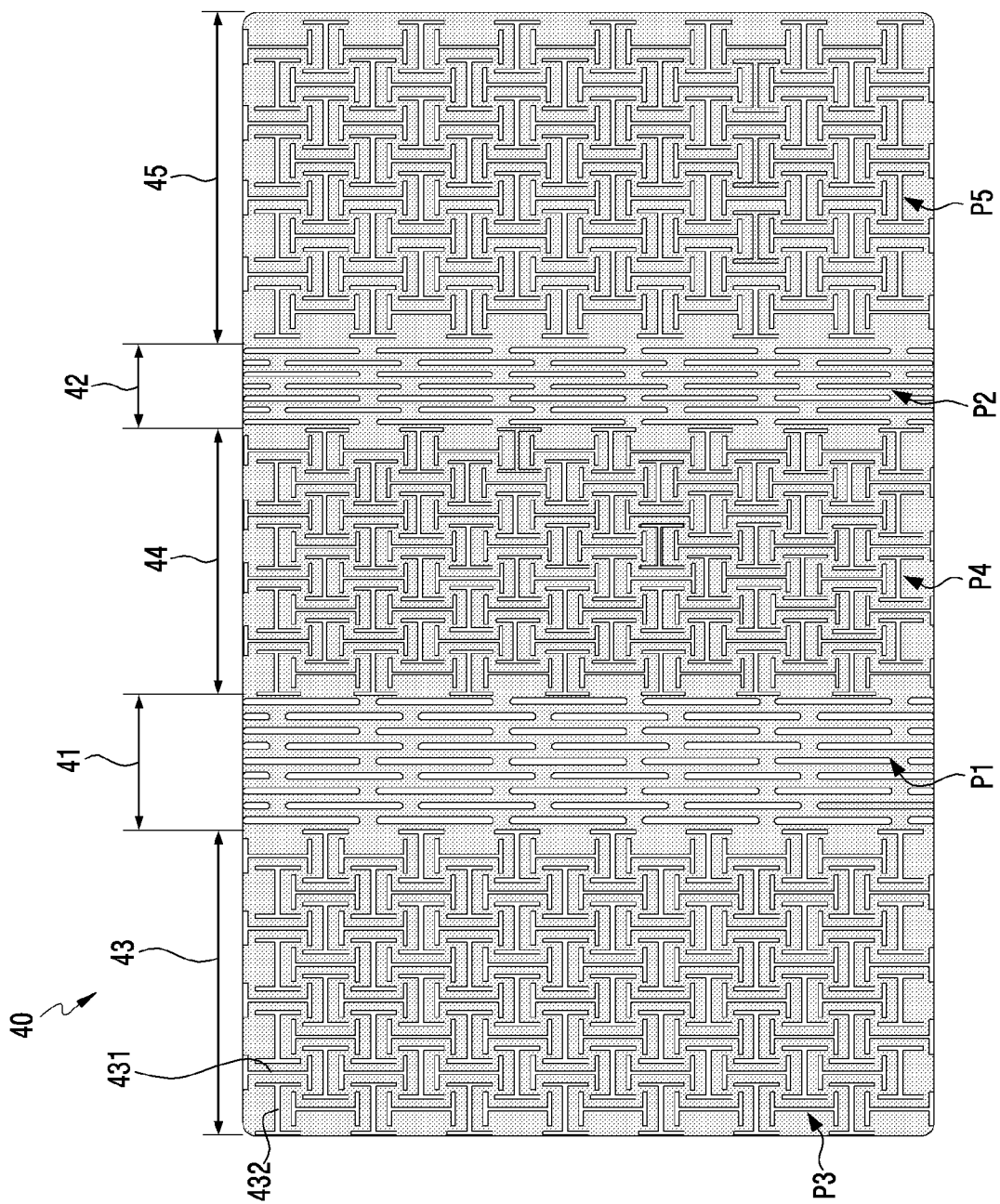
FIG. 8 is a plan view illustrating a metal plate according to an embodiment of the disclosure.

FIG. 8 is a plan view illustrating a metal plate according to an embodiment of the disclosure.

Referring to FIG. 8, according to an embodiment, a metal plate 40 may include third to fifth patterns P3, P4, and P5 in the remaining areas 43, 44, and 45, except for first folding area 41 and second folding area 42. According to an embodiment, the third to fifth patterns P3 to P5 may include a combination of I-shaped patterns 431 and H-shaped patterns 432 different from the shapes in the first pattern P1 or the second pattern P2.

According to an embodiment, the first flat portion 43 on one side of the first folding area 41, the second flat portion 44 between the first and second folding areas 41 and 42, and the third flat portion 45 on the other side of the second folding area 42 may be provided with third to fifth patterns P3 to P5, respectively. According to an embodiment, the third to fifth patterns P3 to P5 may have the same shape or different shapes, respectively. For example, the openings of the third to fifth patterns P3 to P5 may have the same shape or different shapes, respectively.

According to an embodiment, filling members (e.g., an insulating material) may be filled in the first and second openings 431 and 432 formed in any of the third to fifth patterns P3 to P5. According to an embodiment, the first openings 431 or the second openings 432 may be provided to define a flat surface on the metal plate 40 with the filling members. According to an embodiment, the filling members may include an elastic material that is cured and/or solidified after being filled in the first openings 431 or the second openings 432. According to an embodiment, the filling members may include resin, urethane, silicone, or rubber. According to an embodiment, the filling material filled in the first and second openings 431 and 432 may be relatively rigid compared to the filling material filled in the openings formed in the first and second folding regions 41 and 42 to be helpful in reinforcing the rigidity.

Figure 9:
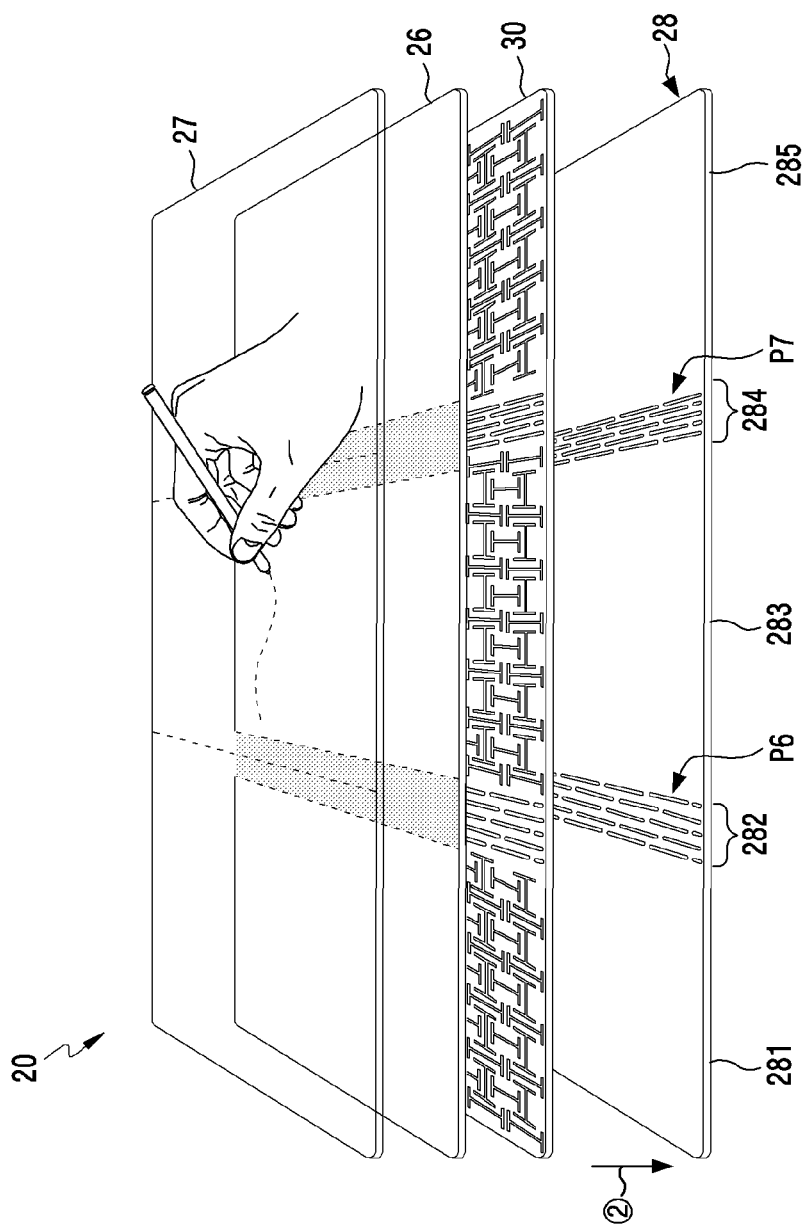
FIG. 9 is an exploded perspective view illustrating a flexible display mounting structure of an electronic device including an input detection panel according to an embodiment of the disclosure.

FIG. 9 is an exploded perspective view illustrating a flexible display mounting structure of an electronic device including an input detection panel according to an embodiment of the disclosure.

Referring to FIG. 9, according to an embodiment, the transparent protective layer 27, the flexible display 26, and the metal plate 30 of the electronic device 20 have the same structures as the transparent protective layer 27 and the flexible display 26 illustrated in FIG. 5 and the metal plate 40 illustrated in FIG. 8, respectively. Therefore, a detailed description thereof will be omitted to avoid redundant descriptions.

According to an embodiment, the electronic device 20 may further include at least one input detection panel 28 disposed on the metal plate 30 in the second direction ② to receive a user input from the flexible display 26. For example, the input detection panel 28 may be a flexible PCB type and may include any of a digitizer panel for pen input and a coil panel (e.g., a wireless charging panel, a near field communications (NFC) coil panel, or a magnetic secure transfer (MST) coil) for magnetic field communication. According to an embodiment, the input detection panel 28 may prevent the input detection panel 28 from being visually recognized from the outside through the metal plate 30.

According to an embodiment, the metal plate 30 may have a structure in which the input detection panel 28 disposed in the second direction ② recognizes an external electronic pen via the metal plate 30. According to an embodiment, the metal plate 30 may have a pattern structure that is capable of passing magnetic fields therethrough to be detected by the input detection panel 28 when an external electronic pen is brought into contact with or close to the outer surface of the flexible display 26 from the outside of the electronic device 20. According to an embodiment, the input detection panel 28 may include differential pattern structures (e.g., sixth and seventh patterns P6 and P7) like the first and second patterns P1 and P2 of the metal plate 30. According to an embodiment, the differential pattern structures provided on the input detection panel 28 may be the same as the differential pattern structures illustrated in FIG. 7.

According to an embodiment, the shape, width, and length of each opening and the distance between the respective openings in the sixth pattern P6 may be the same as the shape, width, and length of each opening and the distance between the respective openings in the first pattern P1 illustrated in FIG. 7. According to an embodiment, the shape, width, and length of each opening and the distance between the respective openings in the seventh pattern P7 may be the same as the shape, width, and length of each opening and the distance between the respective openings in the second pattern P2 illustrated in FIG. 7.

According to an embodiment, first to third flat portions 281, 283, and 285 may include third to fifth patterns P3, P4, and P5 of the metal plate 40 of FIG. 8, respectively. According to an embodiment, the plurality of openings in first and second folding areas 282 and 284 may have a shape that allows the input detection panel 28 to detect a wireless signal (e.g., a resonance frequency) of the electronic pen and to determine the flexural characteristics of the flexible display 26. According to an embodiment, the plurality of openings in the first to third flat portions 281, 283, and 285 may have a shape of a rigid support structure that allows the input detection panel 28 to detect a wireless frequency (e.g., a resonance frequency) of the electronic pen and to support the flexible display 26.

For example, when the input detection panel 28 is a digitizer, signal lines (e.g., a plurality of coil patterns) may be provided in areas other than the plurality of openings, each of which is provided in the input detection panel 28.

Figure 10:
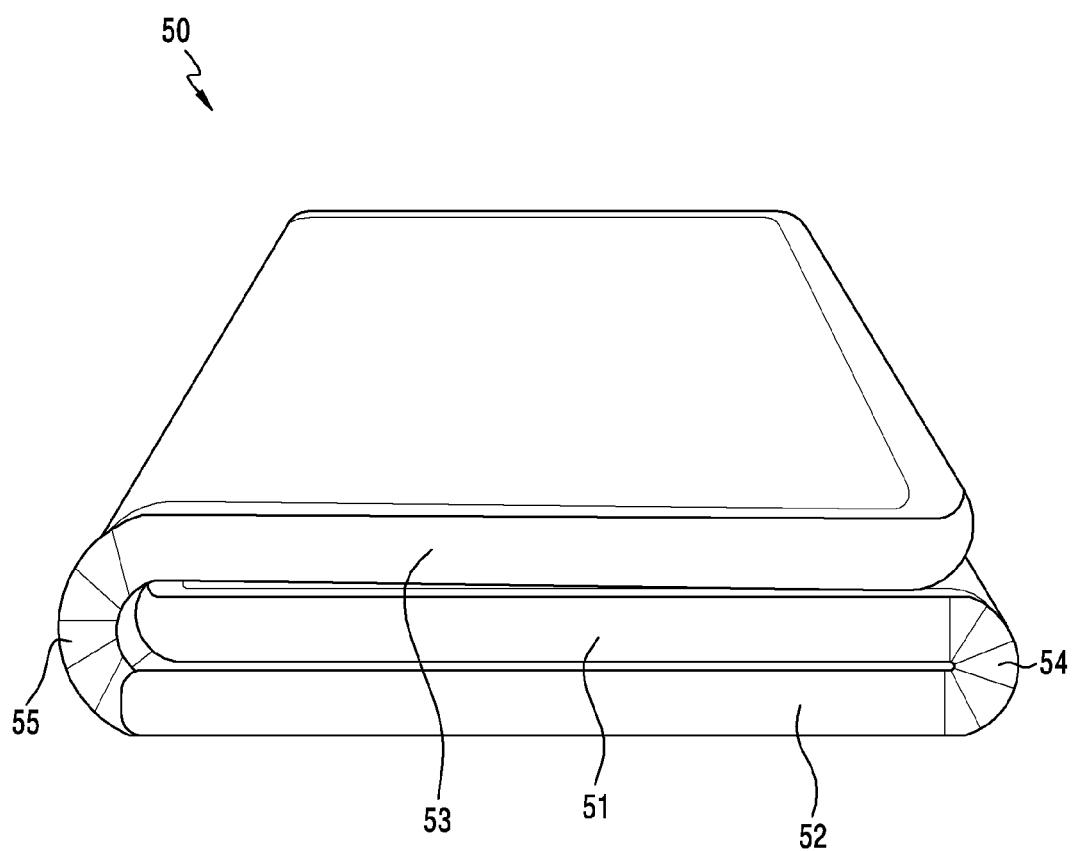
FIG. 10 is a perspective view illustrating a multi-foldable electronic device in a full-folding mode according to an embodiment of the disclosure.

FIG. 10 is a perspective view illustrating a multi-foldable electronic device in a full-folding mode according to an embodiment of the disclosure.

Figure 11:
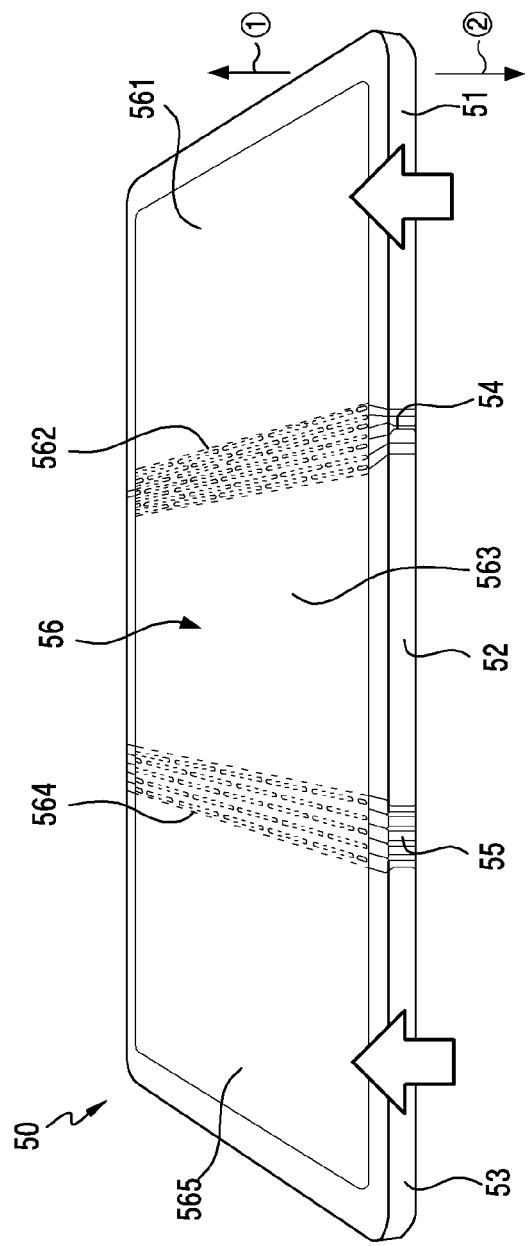
FIG. 11 is a perspective view illustrating an electronic device in a full-unfolding mode according to an embodiment of the disclosure.

FIG. 11 is a perspective view illustrating a multi-foldable electronic device in a full-unfolding mode according to an embodiment of the disclosure.

Referring to FIGS. 10 and 11, a multi-foldable electronic device 50 according to an embodiment may have a structure that is the same at least in part as the multi-foldable electronic device 20 illustrated in FIGS. 2 and 3. According to an embodiment, the multi-foldable electronic device 50 may include first to third housings 51, 52, and 53, first and second folding units 54 and 55, and a flexible display 56.

According to an embodiment, the first folding unit 54 may be a folding assembly that connects the first and second housings 51 and 52 to be folded in an in-folding manner, and the second folding unit 55 may be a folding assembly that connects the second and third housings 52 and 53 to be folded in an in-folding manner. According to an embodiment, in the multi-foldable electronic device 50, the first housing 51 may be disposed to overlap the second housing 52 after being folded onto the second housing 52 in the in-folding manner, and the third housing 53 may be disposed to overlap the first housing 51 after being folded onto the first housing 51 in the in-folding manner. For example, in the multi-foldable electronic device 50 in the full-folding mode, the second housing 52, the first housing 51, and the third housing 53 may be overlapped in the vertical direction.

According to an embodiment, the multi-foldable electronic device 50 may include a flexible display 56 disposed across the first to third housings 51 to 53. According to an embodiment, the flexible display 56 may be the same at least in part as the flexible display 26 illustrated in FIGS. 2 and 3. According to an embodiment, the flexible display 56 may include first and second folding areas 562 and 564 and first, second, and third flat areas 561, 563, and 565. According to an embodiment, the first folding area 562 may be disposed between the first and second flat areas 561 and 563, and the second folding area 564 may be disposed between the second and third flat areas 563 and 565.

According to an embodiment, the flexible display 56 may include a transparent protective layer (e.g., the transparent protective layer 27 illustrated in FIG. 5) disposed in a first direction ① and a metal plate (e.g., the metal plate 30 illustrated in FIG. 5) disposed in a second direction ②. Hereinafter, the structure of the metal plate will be described.

Figure 12:
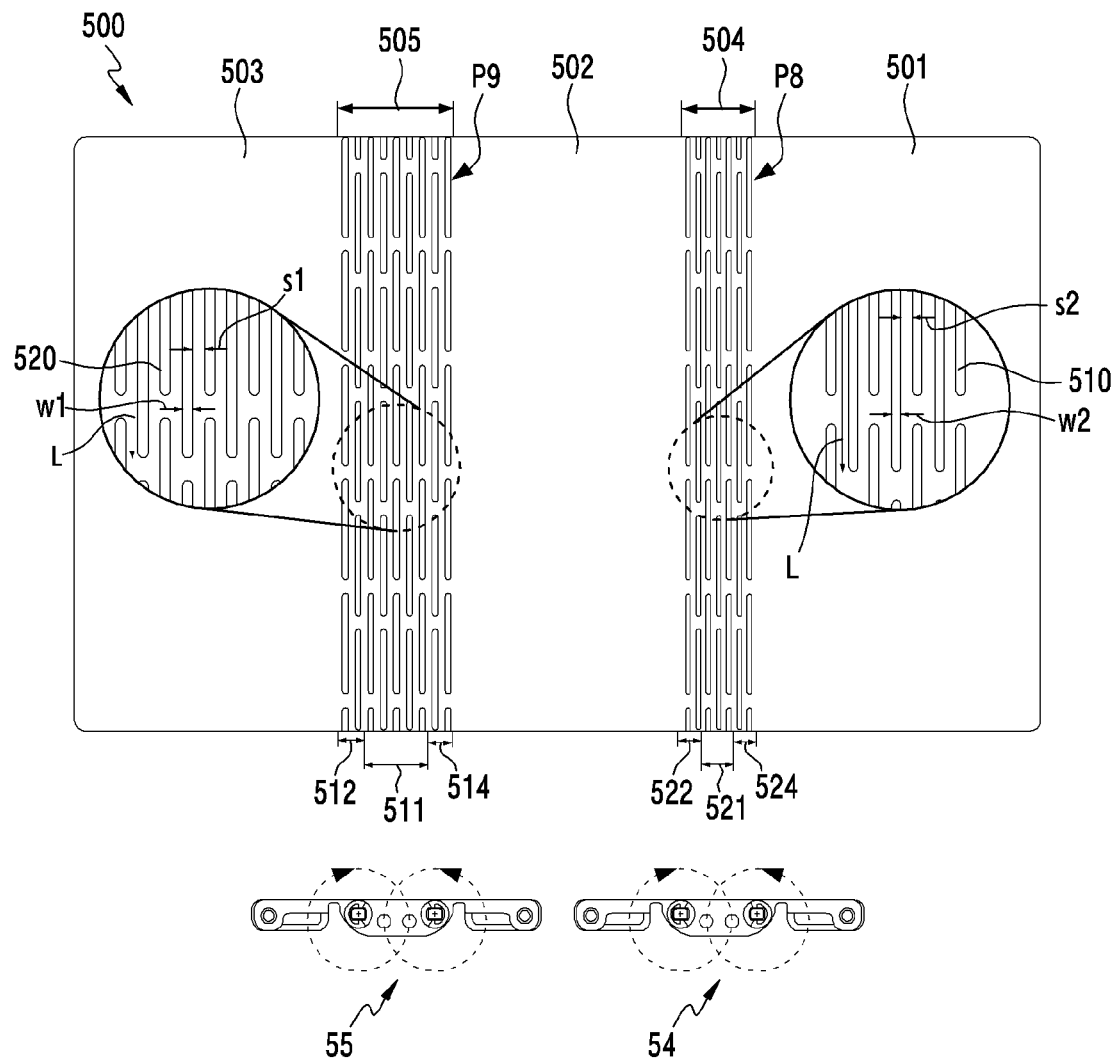
FIG. 12 is a plan view illustrating a metal plate according to an embodiment of the disclosure.

FIG. 12 is a plan view illustrating a metal plate disposed on a multi-foldable electronic device according to an embodiment of the disclosure.

Referring to FIG. 12, according to an embodiment, a metal plate 500 may have a structure that is the same in whole or at least in part as the metal plate 30 illustrated in FIG. 7. According to an embodiment, the metal plate 500 may have a structure that is at least the same in whole or at least in part as the metal plate illustrated in FIG. 8.

According to an embodiment, the metal plate 500 may include first and second folding areas 504 and 505 and first to third flat areas 501, 502, and 503. According to an embodiment, an eighth pattern P8 may be provided in the first folding area 504, and a ninth pattern P9 may be provided in the second folding area 505. According to an embodiment, the first folding area 504 of the metal plate may include the first bending portion 521 and first and second flat portions 522 and 524. According to an embodiment, the second folding area 505 of the metal plate may include the second bending portion 511 and third and fourth flat portions 512 and 514.

According to an embodiment, first openings 510 in the eighth pattern P8 and second openings 520 formed in the ninth pattern P9 may have different shapes s1, s2, w1, w2, and L as described with regard to FIG. 7.

According to an embodiment, in the multi-foldable electronic device (e.g., the multi-foldable electronic device 50 illustrated in FIG. 10), the first and second flat portions 501 and 502 may be folded in an in-folding manner by the first folding unit 54, and the second and third flat portions 502 and 503 may be folded in an in-folding manner by the second folding unit 55.

According to an embodiment, in the multi-foldable electronic device, the first flat portion 501 may be folded in a first in-folding manner by the first folding unit 54, and the third flat portion 503 may be folded in a second in-folding manner by the second folding unit 55 different from the first folding unit 54. For example, the first and second folding operations may be different from each other.

Figure 13:
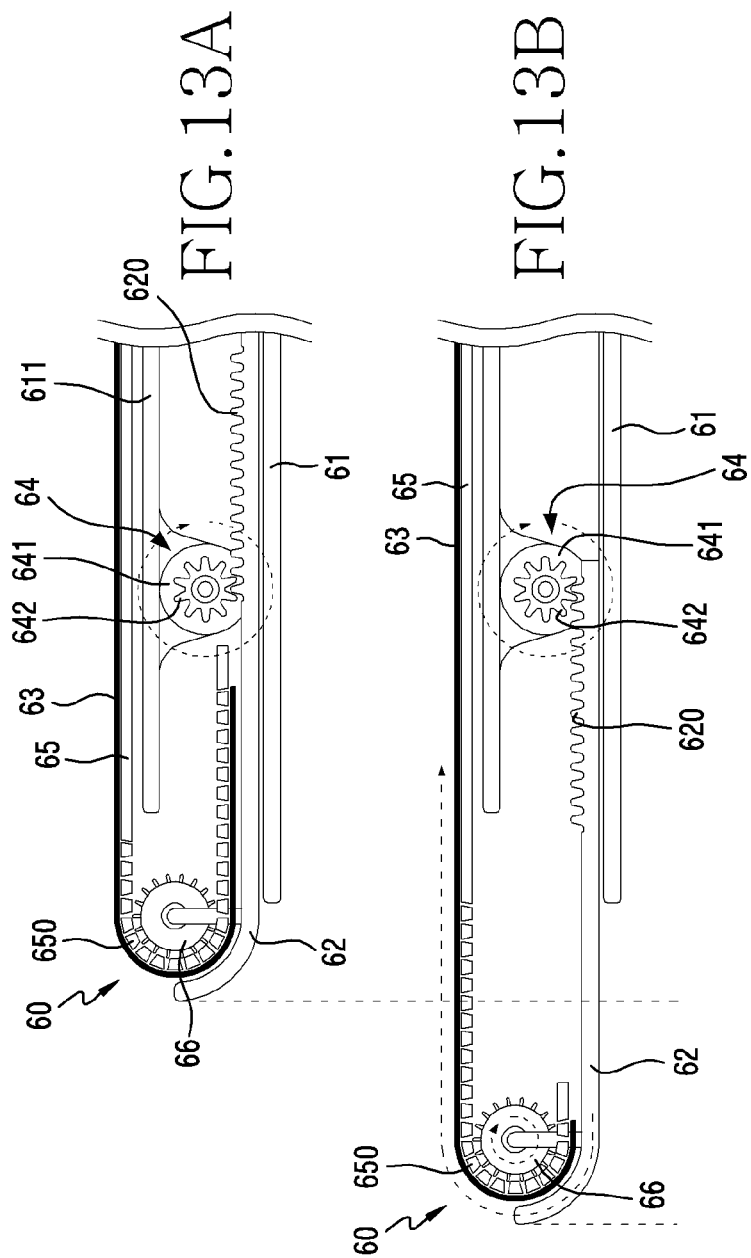
FIGS. 13A and 13B are side views illustrating an electronic device in sliding-in and sliding-out states according to various embodiments of the disclosure.

FIGS. 13A and 13B are side views illustrating an electronic device in sliding-in and sliding-out states according to various embodiments of the disclosure.

Referring to FIGS. 13A and 13B, an electronic device 60 according to an embodiment may include a main body housing 61, a sliding housing 62, a flexible and/or rollable display 63, a driving unit 64, and/or a metal plate 65.

According to an embodiment, in the electronic device 60, the sliding housing 62 may implement a sliding-in or sliding-out operation on the main body housing 61. According to an embodiment, a flexible display 63 having a variable display area may be disposed on the sliding housing 62. The electronic device 60 in the sliding-out state may include an expanded display area of the flexible display 63, and the electronic device 60 in the sliding-in state may include a display area that is always exposed as the smallest display area.

According to an embodiment, the sliding housing 62 may cover a portion of the flexible display 63 (e.g., a rear and side portion) to protect the flexible display 63 from external impacts and scratches.

According to an embodiment, a sliding guide rail 620 may be provided in a portion of the electronic device 60 for sliding in/out of the sliding housing 62. According to an embodiment, the sliding guide rail 620 is engaged with the driving unit 64, whereby the sliding housing 62 can implement a sliding-in/out operation according to the driving of the driving unit 64.

According to an embodiment, in the sliding-out state, the display area of the flexible display 63 can be expanded, and the flexible display 63 can be pulled out from the main body housing 61. For example, the flexible display 63 may include an unbreakable (UB) type OLED (e.g., a curved display).

According to an embodiment, the driving unit 64 may include a rotating gear 641 and a rolling actuator 642. According to the driving of a driving motor (not illustrated), rotation of the rotation gear 641 engaged with the sliding guide rail 620 makes the sliding housing 62 slidably movable.

According to an embodiment, the flexible display 63 may include an OLED layer configured to display a screen, a transparent layer (e.g., ultra-thin glass) configured to protect the OLED layer, and a metal plate 65 including a multi-bar portion 650 below the OLED layer. According to an embodiment, the metal plate 65 may be supported by a front plate 611, which is a portion of the body housing 61, and the sliding housing 62 may be supported by the main body housing 61 (e.g., a back cover).

According to an embodiment, in the electronic device 60, a roller 66 may be disposed to face the driving unit 64. According to an embodiment, the roller 66 may support sliding-in/out of the expandable display area of the flexible display 63. According to an embodiment, the roller 66 has protrusions on the outer circumferential surface thereof, which are engaged with the openings in the multi-bar portion 650 of the metal plate 65, thereby supporting the sliding-in/out operation of the metal plate 65.

Figure 14:
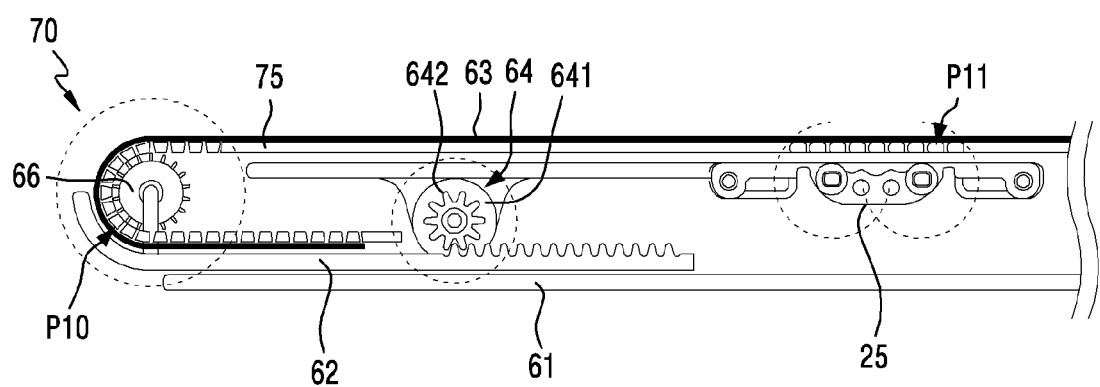
FIG. 14 is a side view illustrating an electronic device in a sliding-in state according to an embodiment of the disclosure.

FIG. 14 is a side view illustrating an electronic device in a sliding-in state according to an embodiment of the disclosure.

Figure 15:
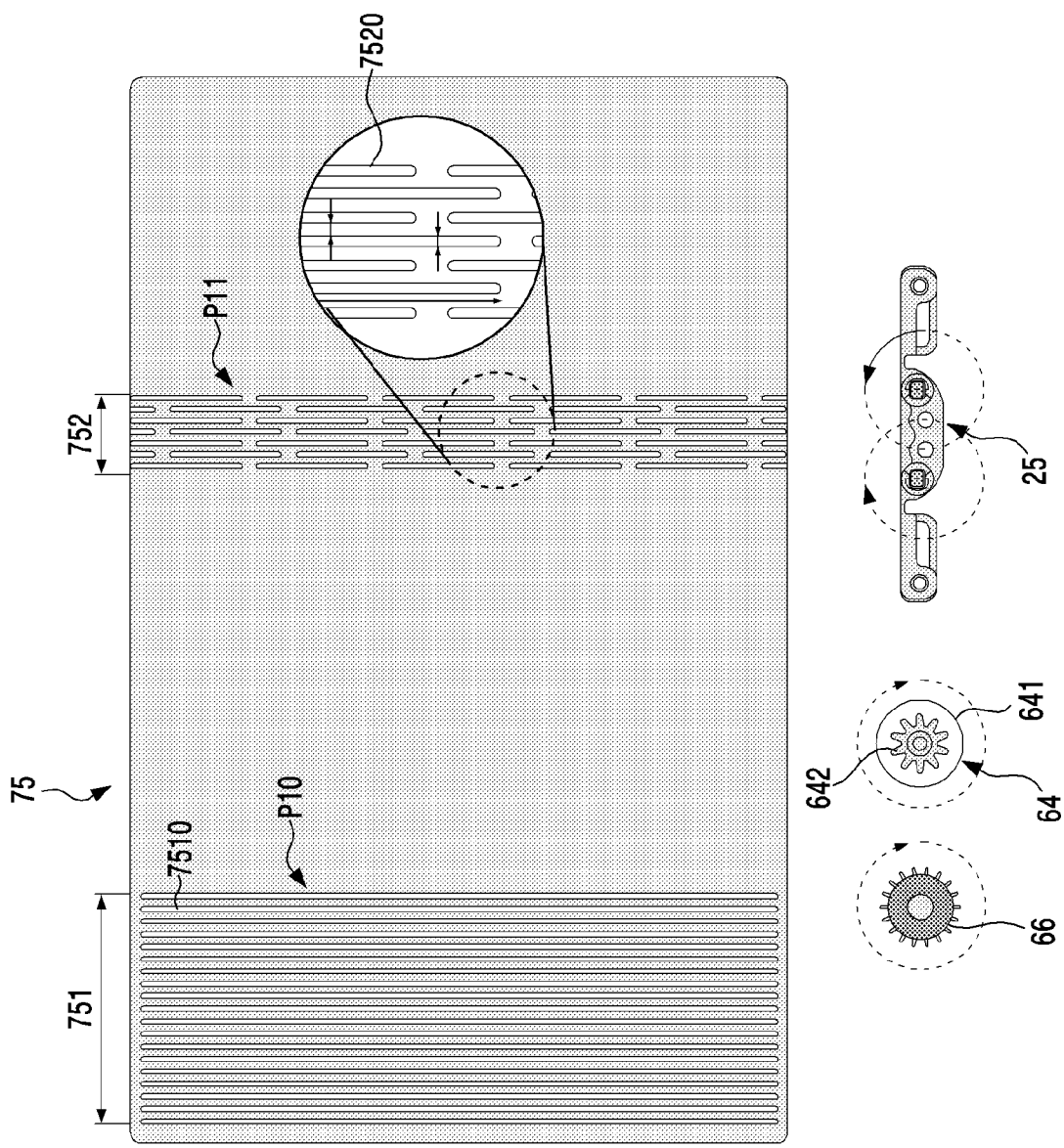
FIG. 15 is a plan view illustrating a metal plate according to an embodiment of the disclosure.

FIG. 15 is a plan view illustrating a metal plate according to an embodiment of the disclosure.

Referring to FIGS. 14 and 15, an electronic device 70 according to an embodiment may include a sliding structure and a folding structure. According to an embodiment, the electronic device 70 may implement a sliding-in/out operation while maintaining a parallel state with respect to the sliding housing 62 on one side and a folding operation with respect to the main housing 61 on the other side. According to an embodiment, the electronic device 70 may implement the same sliding-in/out operation as the electronic device 60 illustrated in FIGS. 13A and 13B and may include a flexible display 63 that is capable of performing an in-folding operation that is the same at least in part as the electronic device 20 illustrated in FIGS. 2 to 4.

According to an embodiment, the flexible display 63, which implements the sliding-in/out operation and the in-folding operation, may include a rolling part and a folding part, and a metal plate 75 may include a sliding area 751 corresponding to the rolling part and a folding area 752 corresponding to the folding part. According to an embodiment, the metal plate 75 has a structure in which differential patterns are provided, wherein a tenth pattern P10 may be provided in the sliding area 751, and an eleventh pattern P11 different from the tenth pattern may be in the folding area 752.

According to an embodiment, the flexible display 63 may be a rollable display in which a sliding-in/out operation is implemented by driving the roller 66. According to an embodiment, the roller 66 may include a plurality of protrusions (e.g., a gear structure) on the outer circumferential surface thereof. Each protrusion may be engaged with each of first openings 7510 provided in the tenth pattern P10 of the metal plate 75.

Referring to FIG. 15, according to an embodiment, in the metal plate 75, since rolling (deformation) of a relatively large radius of curvature occurs on the flexible display 63 in the sliding area 751, the tenth pattern P10 having a relatively large number of patterns may be provided over a wide area. According to an embodiment, in the metal plate 75, since rolling (deformation) of a small radius of curvature occurs on the flexible display 63 in the folding area 752, the eleventh pattern P11 having a relatively small number of patterns may be provided over a narrow area. According to an embodiment, the tenth pattern P10 may include a plurality of first openings 7510, and the eleventh pattern P11 has a structure that is the same at least in part as the second pattern P2 illustrated in FIG. 7, and may include a plurality of second openings 7520. According to an embodiment, the first openings 7510 may extend in a direction perpendicular to the sliding direction from one end to the other end of the metal plate 75, and the first pattern P may have a structure in which the plurality of openings are arranged in the sliding direction. According to an embodiment, the second openings 7520 may have a structure that is the same at least in part as the second openings 320 of the second pattern P2 illustrated in FIG. 7. According to an embodiment, the second openings may be arranged at an equal interval in the sliding direction and extend in a direction perpendicular to the sliding direction.

According to an embodiment, the width of each of the first openings 7510 may be adjusted according to the sliding length of the flexible display (e.g., the flexible display 63 illustrated in FIG. 14). For example, as the sliding length of the flexible display 63 increases, the number of first openings 7510 may also increase. For example, each of the first openings 7510 may have a linear shape.

According to an embodiment, the distance between the respective first openings 7510 may be interlocked with the distance between the protrusions on the roller 66. For example, as the distance between the respective first openings 7510 increases, the distance between the respective protrusions may increase in proportion thereto.

According to an embodiment, each of the first openings 7510 has an elongated straight-line shape, which makes it possible to arrange a plurality of rollers 66. With this structure, it is possible to maintain the rolling speed of the flexible display 63 constant.

Figure 16:
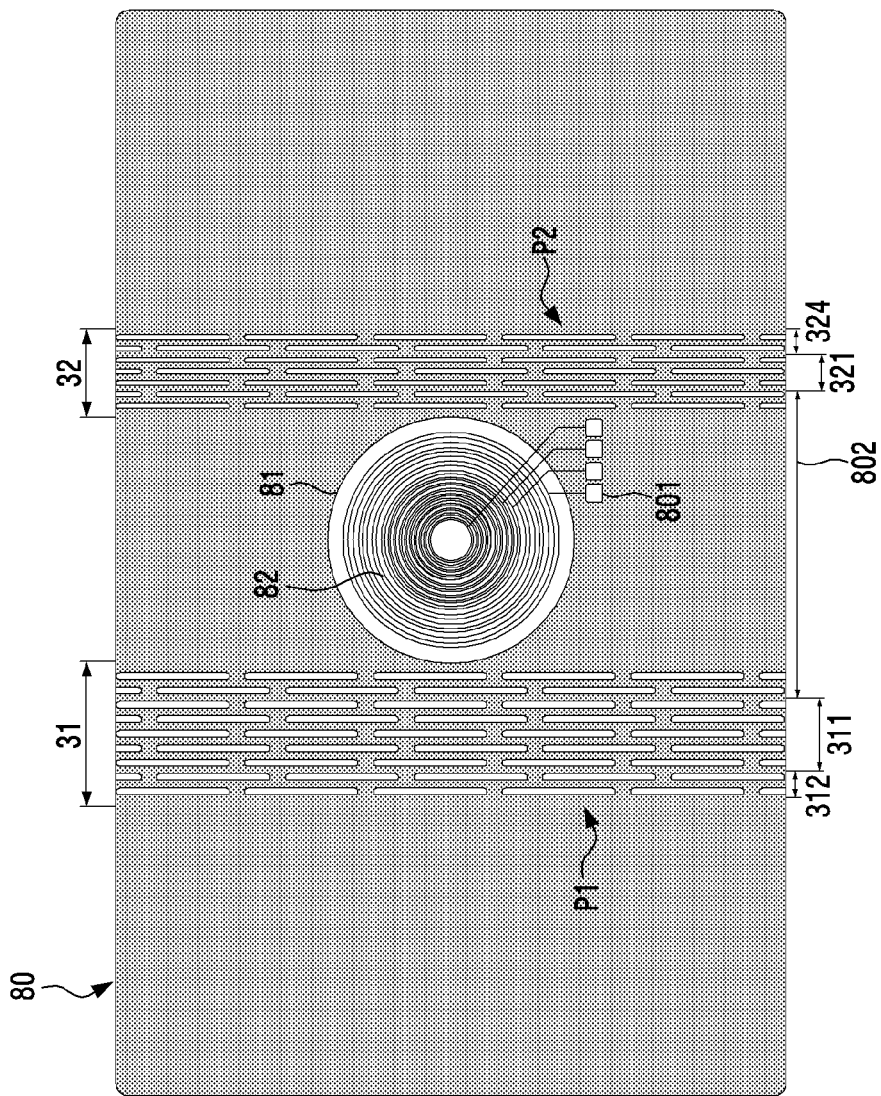
FIG. 16 is a plan view illustrating a metal plate according to an embodiment of the disclosure.

FIG. 16 is a plan view illustrating a metal plate according to an embodiment of the disclosure.

Referring to FIG. 16, according to an embodiment, a metal plate 80 is configured to be the same as the metal plate 30 illustrated in FIG. 7, and may further include at least one big opening 81 for a wireless charging coil 82 in a flat area 802. According to an embodiment, the electronic device may transmit/receive a magnetic field charging signal generated by the wireless charging coil 82 to the flexible display 63 through the big opening 81. According to an embodiment, the big opening 81 may be filled with an injection-molded material (polymer). For example, the big opening 81 need not be limited to a circular shape, but may have a polygonal shape. Reference numeral 801 may indicate signal pads.

While the disclosure has been shown and described with reference to various embodiments thereof, it will be understood by those skilled in the art that various changes in form and detail may be made therein without departing from the spirit and scope of the disclosure as defined by the appended claims and their equivalents.

What is claimed is:

1. A multi-foldable electronic device comprising:
   a first housing;
   a second housing;
   a third housing;
   a first folding unit configured to allow the first and second housings to be folded in a first folding manner;
   a second folding unit configured to allow the second and third housings to be folded in a second folding manner;
   a flexible display disposed across the first, second, and third housings; and
   a metal plate disposed to face the flexible display to support a folding operation of the flexible display, the metal plate comprising:
      a first folding area in which a first pattern is disposed, and
      a second folding area in which a second pattern different from the first pattern is disposed,
   wherein the first pattern comprises a plurality of first openings,
   wherein the second pattern comprises a plurality of second openings, and
   wherein the plurality of first openings and the plurality of second openings are filled with a first filling material that is elastic.

2. The multi-foldable electronic device of claim 1,
   wherein the first folding unit is configured to allow the first and second housings to be folded in a folded-out manner, and
   wherein the second folding unit is configured to allow the second and third housings to be folded in a folded-in manner.

3. The multi-foldable electronic device of claim 1,
   wherein the first folding unit is configured to allow the first and second housings to be folded in a first folded-in manner, and
   wherein the second folding unit is configured to allow the second and third housings to be folded in a second folded-in manner different from the first folded-in manner.

4. The multi-foldable electronic device of claim 1, wherein the first pattern has a width greater than a width of the second pattern.

5. The multi-foldable electronic device of claim 4,
   wherein each of the first openings extends along a first folding axis provided by the first folding unit, and
   wherein each of the second openings extends along a second folding axis provided by the second folding unit.

6. The multi-foldable electronic device of claim 5, wherein a first width of each of the first openings and a first distance between the respective first openings are greater than a second width of each of the second openings and a second distance between the respective second openings, respectively.

7. The multi-foldable electronic device of claim 5, wherein a first length of each of the first openings is equal to a second length of each of the second openings.

8. The multi-foldable electronic device of claim 1, further comprising:
a third pattern disposed between one end of the metal plate and the first folding area,
wherein the third pattern is different from the first and second patterns.

9. The multi-foldable electronic device of claim 8, further comprising:
a fourth pattern disposed between the first folding area and the second folding area,
wherein the fourth pattern is different from the first and second patterns.

10. The multi-foldable electronic device of claim 9, further comprising:
a fifth pattern disposed between another end of the metal plate and the second folding area,
wherein the fifth pattern is different from the first and second patterns.

11. The multi-foldable electronic device of claim 10,
wherein the third, fourth, and fifth patterns comprise a plurality of third openings, and
wherein the plurality of third openings are filled with a second filling material that is more rigid than the first filling material, the second filling material configured to reinforce rigidity of the metal plate.

12. The multi-foldable electronic device of claim 10, wherein the third, fourth, and fifth patterns comprise a combination of I-shaped patterns and H-shaped patterns different from shapes of the first pattern and the second pattern.

13. The multi-foldable electronic device of claim 1, wherein the flexible display comprises:
a first folding area folded according to a first folding axis provided by the first folding unit; and
a second folding area folded according to a second folding axis provided by the second folding unit.

14. The multi-foldable electronic device of claim 13, wherein the flexible display further comprises:
a first surface oriented in a first direction;
a second surface oriented in a second direction opposite the first direction; and
a transparent protective layer disposed to face the first surface, and wherein the metal plate is disposed to face the second surface.

15. The multi-foldable electronic device of claim 14, wherein the metal plate is bonded to the second surface of the flexible display.

16. The multi-foldable electronic device of claim 13, wherein the metal plate comprises:
a third surface oriented in a first direction;
a fourth surface oriented in a second direction opposite to the first direction; and
an input detection panel disposed on the fourth surface.

17. The multi-foldable electronic device of claim 16, wherein the input detection panel comprises:
a sixth pattern disposed at a location facing the first pattern; and
a seventh pattern disposed at a location facing the second pattern.

18. The multi-foldable electronic device of claim 17, wherein the seventh pattern has a width smaller than a width of the sixth pattern.

19. The multi-foldable electronic device of claim 1, wherein the metal plate further comprises at least one opening for a wireless charging coil disposed between the first and second folding areas.

20. A foldable electronic device comprising:
a main body housing configured to be folded by a folding unit;
a sliding housing configured to perform a sliding-in/sliding-out operation relative to the main body housing while maintaining a parallel state;
a driving unit disposed in the main body housing and configured to provide a force for the sliding-in/sliding-out operation;
a rollable display disposed over the main body housing and the sliding housing and comprising a display area configured to expand in response to a sliding-out operation of the sliding housing; and
a metal plate disposed to face the rollable display and configured to support a sliding and folding operation of the rollable display, the metal plate comprising:
a sliding area in which a first pattern is disposed, and
a folding area in which a second pattern different from the first pattern is disposed.

21. The foldable electronic device of claim 20, wherein the first pattern has a width greater than a width of the second pattern.

22. The foldable electronic device of claim 21,
wherein the first pattern comprises a plurality of first openings arranged at an equal interval along a sliding direction and extending in a direction perpendicular to the sliding direction, and
wherein the second pattern comprises a plurality of second openings arranged at an equal interval along the sliding direction and extending in a direction perpendicular to the sliding direction, and arranged at an equal interval in the direction perpendicular to the sliding direction.

23. The foldable electronic device of claim 20, further comprising:
a sliding guide rail configured to engage with the driving unit for sliding-in/sliding-out of the sliding housing according to driving of the driving unit.

24. The foldable electronic device of claim 23,
wherein the driving unit comprises:
a rotating gear;
a rolling actuator; and
a driving motor configured to rotate the rotation gear, and
wherein rotation of the rotation gear engaged with the sliding guide rail slidably moves the sliding housing.

25. The foldable electronic device of claim 20, wherein the rollable display comprises:
an organic light-emitting diode (OLED) layer configured to display a screen;
a transparent layer configured to protect the OLED layer; and
the metal plate comprising a multi-bar portion below the OLED layer.

* * * * *